United States Patent
Ljolje et al.

(10) Patent No.: US 8,346,549 B2
(45) Date of Patent: Jan. 1, 2013

(54) SYSTEM AND METHOD FOR SUPPLEMENTAL SPEECH RECOGNITION BY IDENTIFIED IDLE RESOURCES

(75) Inventors: Andrej Ljolje, Morris Plains, NJ (US); Mazin Gilbert, Warren, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 250 days.

(21) Appl. No.: 12/631,131

(22) Filed: Dec. 4, 2009

(65) Prior Publication Data

US 2011/0137648 A1 Jun. 9, 2011

(51) Int. Cl.
*G10L 15/00* (2006.01)

(52) U.S. Cl. ............... 704/231; 704/236; 704/270.1

(58) Field of Classification Search ............ 704/231, 704/236, 251, 255, 270.1; 379/88.01; 718/104, 718/105
See application file for complete search history.

(56) References Cited

U.S. PATENT DOCUMENTS

| | | | | |
|---|---|---|---|---|
| 4,922,538 A * | 5/1990 | Tchorzewski | | 704/247 |
| 5,721,923 A * | 2/1998 | Hamilton | | 718/104 |
| 5,895,448 A * | 4/1999 | Vysotsky et al. | | 704/270.1 |
| 6,229,880 B1 * | 5/2001 | Reformato et al. | | 379/88.01 |
| 6,282,268 B1 * | 8/2001 | Hughes et al. | | 379/88.03 |
| 6,327,568 B1 * | 12/2001 | Joost | | 704/270.1 |
| 6,629,075 B1 * | 9/2003 | Schalkwyk | | 704/270 |
| 6,704,707 B2 * | 3/2004 | Anderson et al. | | 704/231 |
| 6,757,655 B1 * | 6/2004 | Besling et al. | | 704/270.1 |
| 7,016,835 B2 * | 3/2006 | Eide et al. | | 704/231 |
| 7,146,321 B2 * | 12/2006 | Cyr et al. | | 704/270.1 |
| 7,228,275 B1 * | 6/2007 | Endo et al. | | 704/235 |
| 2002/0046023 A1 * | 4/2002 | Fujii et al. | | 704/231 |
| 2005/0065796 A1 * | 3/2005 | Wyss et al. | | 704/270 |
| 2005/0096905 A1 * | 5/2005 | Steinbiss | | 704/233 |
| 2006/0009980 A1 * | 1/2006 | Burke et al. | | 704/270 |
| 2006/0184360 A1 * | 8/2006 | Murveit et al. | | 704/231 |
| 2007/0143116 A1 * | 6/2007 | De Armas et al. | | 704/270.1 |
| 2008/0077386 A1 * | 3/2008 | Gao et al. | | 704/3 |
| 2009/0138265 A1 * | 5/2009 | Willett et al. | | 704/251 |
| 2010/0211391 A1 * | 8/2010 | Chen | | 704/249 |

* cited by examiner

*Primary Examiner* — Martin Lerner

(57) ABSTRACT

Disclosed herein are systems, methods, and computer-readable storage media for improving automatic speech recognition performance. A system practicing the method identifies idle speech recognition resources and establishes a supplemental speech recognizer on the idle resources based on overall speech recognition demand. The supplemental speech recognizer can differ from a main speech recognizer, and, along with the main speech recognizer, can be associated with a particular speaker. The system performs speech recognition on speech received from the particular speaker in parallel with the main speech recognizer and the supplemental speech recognizer and combines results from the main and supplemental speech recognizer. The system recognizes the received speech based on the combined results. The system can use beam adjustment in place of or in combination with a supplemental speech recognizer. A scheduling algorithm can tailor a particular combination of speech recognition resources and release the supplemental speech recognizer based on increased demand.

20 Claims, 4 Drawing Sheets

SYSTEM AND METHOD FOR SUPPLEMENTAL SPEECH RECOGNITION BY IDENTIFIED IDLE RESOURCES

BACKGROUND

1. Technical Field

The present disclosure relates to automatic speech recognition (ASR) and more specifically to improving performance of ASR using idle recognition resources.

2. Introduction

Currently, speech recognition applications are configured as a compromise between many opposing interests, such as high enough accuracy, low enough computational load, low enough latency, etc. One significant element of these opposing interests is the hardware and computing resources necessary to perform the speech recognition. Speech recognition systems provision hardware to deal with peak load demands which may occur at some regular interval or in extreme situations. However, this approach leaves a lot of speech recognition hardware idle at off peak periods. Typically the off peak periods constitute the vast majority of the time. Imperfect performance of the ASR systems means that there are costs associated with incorrect recognition, and any improvement in recognition accuracy is desirable.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
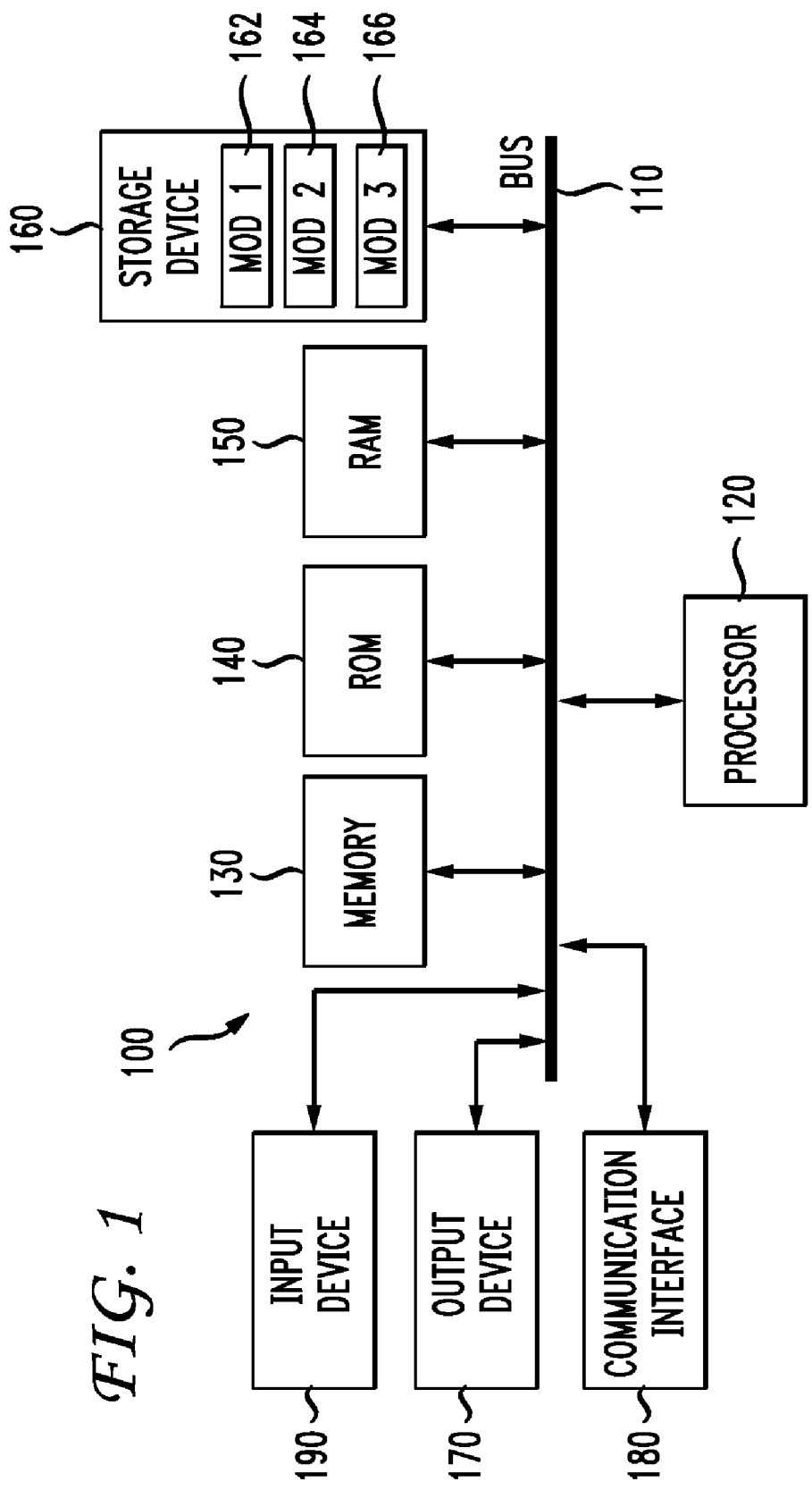
FIG. 1 illustrates an example system embodiment.

The approach disclosed herein utilizes idle hardware to improve the recognition performance with slower and larger solutions that are impractical at peak load times, but are suitable for off peak times, providing higher recognition accuracy. Speech recognition applications typically include the necessary hardware to handle projected or historical peak load conditions, given the best ASR configuration in terms of accuracy vs. hardware load, cost, latency, etc. trade offs. Those peak conditions are relatively rare, and might occur once or twice a day or one or more days a week, for example. Much of the time, much of the hardware is idle. The ASR configuration used in speech recognition applications can be configured differently for higher accuracy, but at the expense of additional processing or additional cost. For example, one approach combines output of two or more recognizers trained in different ways to provide output that is more accurate then the speech recognition output from any single recognizer alone. This and other approaches in combination can utilize hardware more effectively in off-peak times to provide more accurate recognition output with virtually no additional cost in the application provisioning. An ASR system can use a single more load intensive solution or a collection of relatively less load intensive solutions selectively for the most "needy" applications, or when accuracy is most important as the CPU cycles become available. The ASR system can make this decision based on what is more appropriate and beneficial for the ASR task at hand.

In one aspect, an ASR system runs multiple recognizers in parallel, each of which is trained with slightly different characteristics, such as a different spectral analysis in the front end, different pronouncing dictionaries, different training algorithms, etc. In this manner, the ASR system produces an improved recognition output by combining the individual recognition outputs in any number of possible ways. This solution, although more accurate than the best individual system, is also larger, slower, and introduces marginally longer latencies. In general the requirements of additional hardware to process the input speech outweigh the benefit of this approach. However, if the speech recognition hardware is already idle during off peak load periods, the system can implement larger and more complex speech recognition algorithms without incurring any additional cost besides a somewhat more elaborate scheduling algorithm. The more elaborate scheduling algorithm can be tailored to a particular combination of applications running on the hardware platforms.

This approach can provide improved recognition accuracy through more elaborate and computationally expensive ASR solutions during off peak periods without the additional cost and/or additional hardware when the available hardware is under-utilized during off peak load times, which is most of the time.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
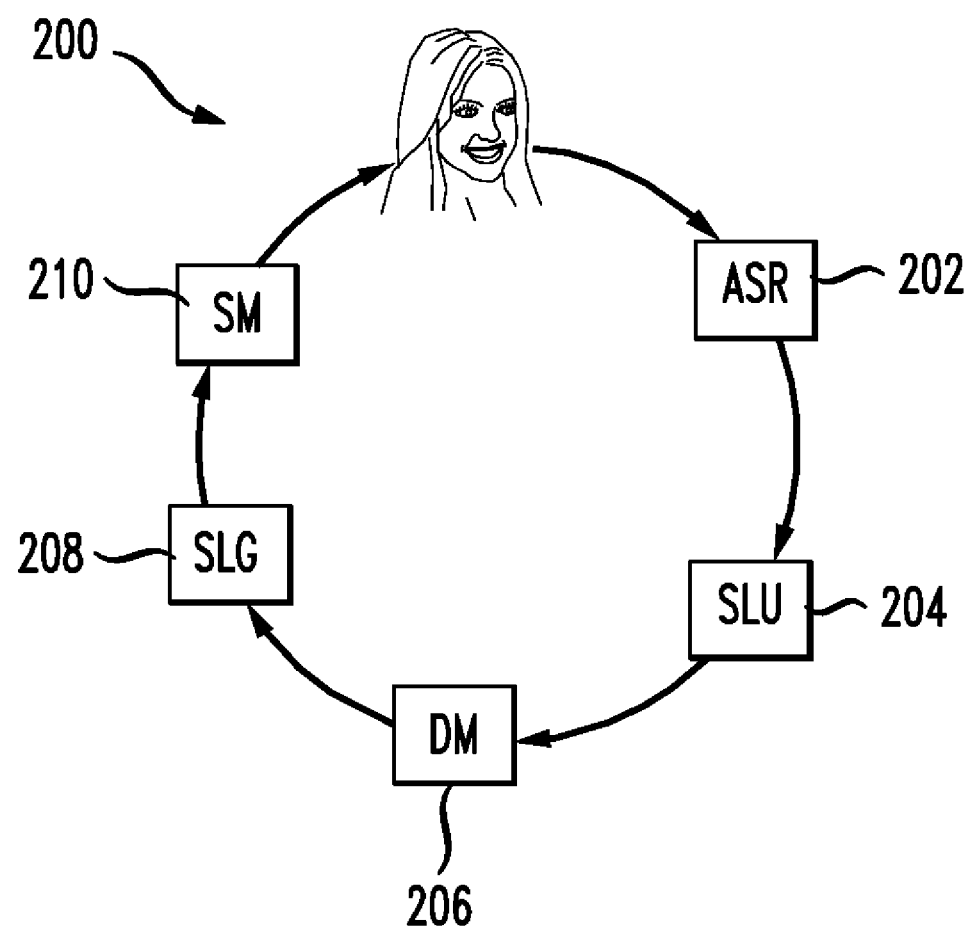
FIG. 2 is a functional block diagram that illustrates an exemplary natural language spoken dialog system.

FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module represents any type of speech output. The present disclosure focuses on innovations related to the ASR module 202 and can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system.

For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 2.

Figure 3:
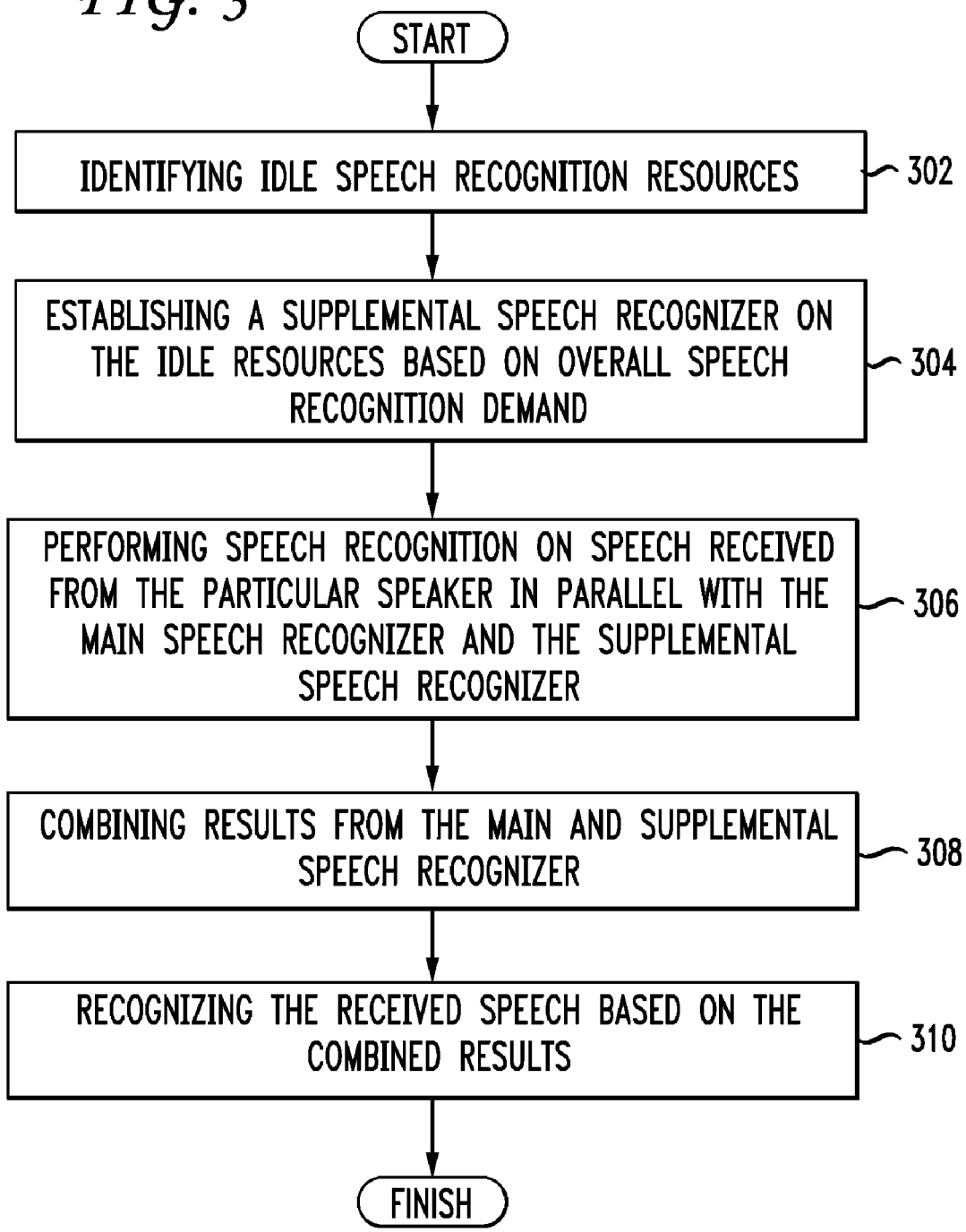
FIG. 3 illustrates an example method embodiment.

Having disclosed some basic system components, the disclosure now turns to the exemplary method embodiment shown in FIG. 3. For the sake of clarity, the method is discussed in terms of an exemplary system 100 such as is shown in FIG. 1 configured to practice the method.

FIG. 3 illustrates a computer-implemented method for improving automatic speech recognition performance. A system 100 identifies idle speech recognition resources (302). Idle speech recognition resources can include networked computing devices, spare CPU cycles, available memory or storage, bandwidth, available throughput on a local bus, etc. In one aspect, idle resources are not truly idle, but operate in a superfluous way. For example, if two speech recognition resources are recognizing speech together for a particular speaker, and one of the two is able to acceptably recognize the speech by itself, the other can appropriately be termed "idle" even though it is actively engaged in speech recognition. In this situation, the system 100 can reallocate underutilized, superfluous, or otherwise unnecessary resources from their current recognition task to another recognition task. The system 100 can allocate various resources in a single computing device to different recognition tasks.

The system 100 establishes one or more supplemental speech recognizer on the idle resources based on overall speech recognition demand (304). The supplemental speech recognizer can differ from a main speech recognizer. The supplemental speech recognizer and the main speech recognizer can be associated with a particular speaker, group, or class of speakers. A scheduling algorithm can tailor a particular combination of speech recognition resources. The scheduling algorithm can also release the supplemental speech recognizer based on increased demand for speech recognition. Along the lines of the supplemental speech recognizer, the system can establish extra speech recognizers tailored to speech which requires additional accuracy as extra speech recognition resources become idle. For example, the system 100 is assigned to recognize speech that is very difficult, but insufficient resources are currently idle. As new resources become idle or available, the system 100 can establish extra speech recognizers before or during the recognition process to assist in the difficult recognition task. In the case of multiple supplemental speech recognizers, each can differ from each other based on one or more of spectral analysis in a front end, pronouncing dictionaries, and/or training algorithms.

The system 100 performs speech recognition on speech received from the particular speaker in parallel with the main speech recognizer and the supplemental speech recognizer (306) and combines results from the main and supplemental speech recognizer (308). The system 100 then recognizes the received speech based on the combined results (310). The system 100 can return the supplemental speech recognizer to an idle state after recognizing all or some of the received speech. In some cases where the system 100 is uncertain whether to expect additional speech, the system 100 can incrementally release supplemental speech recognizers to an idle state over a determined period of time.

Figure 4:
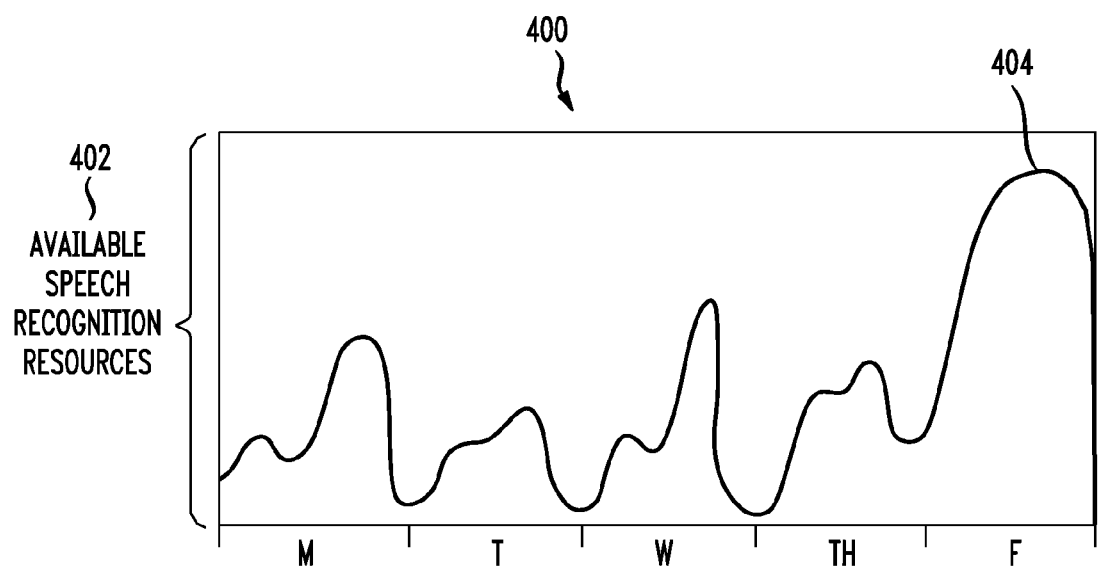
FIG. 4 illustrates a set of speech recognition resources and a plot of speech recognition demand.

FIG. 4 is an exemplary chart 400 of available speech recognition resources 402 and a plot of projected speech recognition demand 404. The chart 400 is divided into weekdays. In this system, the available speech recognition resources are constant. Typically a speech recognition system designer accounts for the projected peak loads and plans the speech recognition system around those projections. As shown here, a typical demand projection 404 only rarely approaches peak demand, in this case only on Fridays. A substantial portion of the speech recognition resources go unused and remain in an idle state in a typical speech recognition system. During periods of low demand such as the low points between days or pretty much any time other than peak load times, a speech recognition system 100 practicing the method disclosed herein can dynamically establish a main speech recognizer and one or more supplemental speech recognizers on the idle resources dedicated to a particular speaker. The system can then process speech from the speaker in parallel with the main speech recognizer and the supplemental speech recognizers, combine results from the main and supplemental speech recognizers, and recognize the received speech based on the combined results. In this way, the speech recognition system 100 can dynamically scale the complexity of the recognition based on overall speech recognition demand. A dynamic spoken dialog system adapts based on needs of particular callers and available speech recognition resources, such as processor cycles, memory, storage space, bandwidth, and so forth.

In one aspect, speech recognizers run faster than real time to provide a level of natural language responsiveness that users expect. The system 100 can dynamically scale some speech recognition properties to run faster or slower based on demand. For example, the system 100 can increase the beam from its nominal value "B" to 1.1*B or 1.2*B to increase recognition accuracy at higher computational cost, while still running at faster speeds than real-time, or reduce the load by using smaller beam of 0.9*B or 0.8*B at the expense of lowered recognition accuracy. The system 100 can introduce larger language models into an existing speech recognizer, which requires increased amounts of memory. The system can allocate additional parallel speech recognizers and combine their recognition results. The system 100 can use different recognizers to provide recognition strings from word lattices and confusion networks which can then be combined using weighted voting (commonly referred to as ROVERing). For example, one recognizer can optimize at the sentence level and another recognizer can optimize at the word level. The system 100 can recognize speech using dialect specific models in parallel with generic speech models. The system 100 can use one or more of these approaches, depending on a user profile, speech characteristics, overall demand, cost, latency, projected demand, and/or other factors. In other words, the system 100 can adapt along a range of complexity that scales based on demand within with available resources and also takes in to account specific user needs.

In one aspect, rather than scaling complexity up, the system 100 scales complexity down to meet demand which exceeds the projected peak and the available speech recognition resources. For example, during such exceptionally high load times, the system can sacrifice 10% accuracy if the decreased accuracy only requires ⅓ as many resources. The system 100 can selectively decrease accuracy for speakers whose speech the system already recognizes very well with few errors, for example. The system can even shave some resources away from the best performing speakers and reallocate them to provide additional help for borderline or needy speakers. In this way, the decrease in accuracy is not as perceptible for these speakers as it would be for speakers whose speech the system recognizes with difficulty. The system 100 can dynamically scale complexity down and back to normal levels as overall demand returns below the available resources.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   projecting, via a processor, an expected demand for speech recognition resources;
   establishing a plurality of speech recognizers based at least in part on the speech recognition resources and the expected demand;
   identifying a main speech recognizer and a supplemental speech recognizer from the plurality of speech recognizers;
   beginning to process a first recognition task using the main speech recognizer, to yield main results; and
   upon determining that the supplemental speech recognizer is idle:
      reallocating the supplemental speech recognizer to the first recognition task based on actual demand for speech recognition resources;
      continuing to process the first recognition task using the supplemental speech recognizer, to yield supplemental results; and
      combining the main results and the supplemental results.

2. The method of claim 1, wherein a scheduling algorithm tailors a particular combination of the plurality of speech recognizers.

3. The method of claim 2, wherein the scheduling algorithm releases the supplemental speech recognizer based on increased demand for speech recognition.

4. The method of claim 1, the method further comprising establishing extra speech recognizers, tailored to speech which requires additional accuracy, upon determining that the supplemental speech recognizer is idle.

5. The method of claim 1, the method further comprising identifying the supplemental speech recognizer as idle upon completing a second recognition task.

6. The method of claim 1, wherein the plurality of speech recognizers comprises networked computing devices.

7. The method of claim 1, further comprising utilizing at least one of word lattices and confusion networks to provide recognition strings as results.

8. The method of claim 1, wherein each speech recognizer in the plurality of speech recognizers differs from each other in at least one of a spectral analysis in a front end, pronouncing dictionaries, and training algorithms.

9. A system comprising:
   a processor;
   a non-transitory computer-readable storage medium storing instructions which, when executed on the processor, performs a method comprising:
      projecting, via a processor, an expected demand for speech recognition resources;
      establishing a plurality of speech recognizers based at least in part on the speech recognition resources and the expected demand;
      identifying a main speech recognizer and a supplemental speech recognizer from the plurality of speech recognizers;
      beginning to process a first recognition task using the main speech recognizer, to yield main results; and
      upon determining that the supplemental speech recognizer is idle:
         reallocating the supplemental speech recognizer to the first recognition task based on actual demand for speech recognition resources;
         continuing to process the first recognition task using the supplemental speech recognizer, to yield supplemental results; and
         combining the main results and the supplemental results.

10. The system of claim 9, wherein a scheduling algorithm tailors a particular combination of the plurality of speech recognizers.

11. The system of claim 10, wherein the scheduling algorithm releases the supplemental speech recognizer based on increased demand for speech recognition.

12. The system of claim 9, the non-transitory computer-readable storage medium storing additional instructions which, when executed on the processor, perform a step comprising establishing extra speech recognizers, tailored to speech which requires additional accuracy, upon determining that the supplemental speech recognizer is idle.

13. The system of claim 9, the non-transitory computer-readable storage medium storing additional instructions which, when executed on the processor, perform a step comprising identifying the supplemental speech recognizer as idle upon completing a second recognition task.

14. The system of claim 9, wherein the plurality of speech recognizers comprises networked computing devices.

15. The system of claim 9, the non-transitory computer-readable storage medium storing additional instructions which, when executed on the processor, perform a step comprising utilizing at least one of word lattices and confusion networks to provide recognition strings as results.

16. The system of claim 9, wherein each speech recognizer in the plurality of speech recognizers differs from each other in at least one of a spectral analysis in a front end, pronouncing dictionaries, and training algorithms.

17. A non-transitory computer-readable storage medium storing instructions which, when executed by a computing device, cause the computing device to perform a method comprising:
   projecting, an expected demand for speech recognition resources;
   establishing a plurality of speech recognizers based at least in part on the speech recognition resources and the expected demand;
   identifying, a main speech recognizer and a supplemental speech recognizer from the plurality of speech recognizers;
   beginning to process a first recognition task using the main speech recognizer, to yield main results; and
   upon determining that the supplemental speech recognizer is idle:
      reallocating the supplemental speech recognizer to the first recognition task based on actual demand for speech recognition resources;
      continuing to perform the first recognition task using the supplemental speech recognizer, to yield supplemental results; and
   combining the main results and the supplemental results.

18. The non-transitory computer-readable storage medium of claim 17, wherein a scheduling algorithm tailors a particular combination of the plurality of speech recognizers.

19. The non-transitory computer-readable storage medium of claim 18, wherein the scheduling algorithm releases the supplemental speech recognizer based on increased demand for speech recognition.

20. The non-transitory computer-readable storage medium of claim 17, storing additional instructions which, when executed by the computing device, cause the computing device to perform a step comprising establishing extra speech recognizers, tailored to speech which requires additional accuracy, upon determining that the supplemental speech recognizer is idle.

* * * * *